(12) United States Patent
Chu

(10) Patent No.: US 7,121,686 B1
(45) Date of Patent: Oct. 17, 2006

(54) CANDLE LIGHT-DIVERSIFYING DEVICE

(76) Inventor: Paul Chu, 7966 Pumpkin Dr., Cupertino, CA (US) 95014

( * ) Notice: Subject to any disclaimer, the term of this patent is extended or adjusted under 35 U.S.C. 154(b) by 0 days.

(21) Appl. No.: 11/265,094

(22) Filed: Nov. 3, 2005

(51) Int. Cl.
*F21V 33/00* (2006.01)
*F21S 19/00* (2006.01)
*F23D 3/16* (2006.01)
*G02B 6/43* (2006.01)
*F21S 15/00* (2006.01)

(52) U.S. Cl. .................. 362/234; 362/569; 362/276; 362/583; 362/228; 362/800; 362/810; 362/581; 431/289

(58) Field of Classification Search ........... 362/234, 362/810, 569, 276, 583, 293, 295, 228, 229, 362/581; 431/125, 289
See application file for complete search history.

(56) References Cited

U.S. PATENT DOCUMENTS

| | | | | |
|---|---|---|---|---|
| 6,033,209 A | * | 3/2000 | Shin et al. | 431/253 |
| 6,074,199 A | * | 6/2000 | Song | 431/253 |
| 7,063,526 B1 | * | 6/2006 | Ham et al. | 431/253 |
| 2002/0093834 A1 | * | 7/2002 | Yu et al. | 362/565 |
| 2005/0239009 A1 | * | 10/2005 | Holmburg | 431/253 |

* cited by examiner

*Primary Examiner*—Alan Cariaso
*Assistant Examiner*—Leah S. Lovell
(74) *Attorney, Agent, or Firm*—Bacon & Thomas

(57) ABSTRACT

A candle light-diversifying device is mounted at a bottom side of a candle which includes a tunnel running through an imaginary central axis thereof, and a candlewick received in the tunnel. The candle light-diversifying device includes a housing having three through holes and an insertion hole; a light-emitting module mounted inside the housing and having a power source, a control circuit, three illuminants, and a photosensitive element, the three illuminants running through the through the three through holes to be exposed outside the housing for emitting red light, blue light, and green light respectively, the photosensitive element having a concavity formed at a top end thereof; and the optical fiber having a spherical portion formed at a bottom end thereof and fixedly mounted in the concavity to be received in the tunnel of the candle. Thus, the candle light-diversifying device enables the candle to emit colorful light.

8 Claims, 4 Drawing Sheets

CANDLE LIGHT-DIVERSIFYING DEVICE

BACKGROUND OF THE INVENTION

1. Field of the Invention

The present invention relates generally to candles, and more particularly, to a candle light-diversifying device that enables a candle to emit colorful light.

2. Description of the Related Art

A conventional candle is usually made of an flammable waxy member and a candlewick mounted inside the waxy member. While the conventional candle is used, the candlewick is flamed to liquefy the wax around the candlewick and then the liquid wax is absorbed by the candlewick for flame. Such candle is conventionally used for illumination only and some people may change the color or gloss of the candle to let the user feel differently atmospheric while the candle is flamed. However, such candle with different color or gloss is still limited to the purpose of illumination only.

While using the candle at one time, the inventor was aware that the candle is semi-transparent such that it occurs to the inventor that the semi-transparency in cooperation with a colored light source can cause mixture of the light to enable colorful gloss of the candle, and thus aesthetic appearance of the candle is better than that of the conventional one.

SUMMARY OF THE INVENTION

The primary objective of the present invention is to provide a candle light-diversifying device, which enables a candle to generate colorful light for much esthetic appearance.

The secondary objective of the present invention is to provide a candle light-diversifying device, which facilitates fixture of an optical fiber and is not subject to defective assembly.

The third objective of the present invention is to provide a candle light-diversifying device, which can sense the light source of the flamed candle without little interference with another light source.

The foregoing objectives of the present invention are attained by the candle light-diversifying device, which is mounted at a bottom side of a candle. The candle includes a tunnel running through an imaginary central axis thereof from a top side thereof to the bottom side, and a candlewick received in the tunnel. The candle light-diversifying device includes a housing, a light-emitting module, and an optical fiber. The housing has three through holes and an insertion hole that run through a top side thereof. The light-emitting module is mounted inside the housing, having a power source, a control circuit, three illuminants, and a photosensitive element. The three illuminants are exposed outside the housing and electrically connected with the control circuit for emitting red light, blue light, and green light respectively. The control circuit is powered by the power source to control the three illuminants for respective or simultaneous illumination. The photosensitive element is electrically connected with the control circuit and located below the insertion hole, having a concavity formed at a top end thereof. The optical fiber has a spherical portion formed at a bottom end thereof and having a larger diameter than that of the insertion hole. The optical fiber is inserted through the insertion hole from its bottom side to its top side to enable the spherical portion to be located inside the housing and fixedly mounted in the concavity. While the housing is mounted at the bottom side of the candle, the optical fiber is received in the tunnel of the candle and a top end of the optical fiber is located as high as that of the candlewick.

DETAILED DESCRIPTION OF PREFERRED EMBODIMENTS

Figure 1:
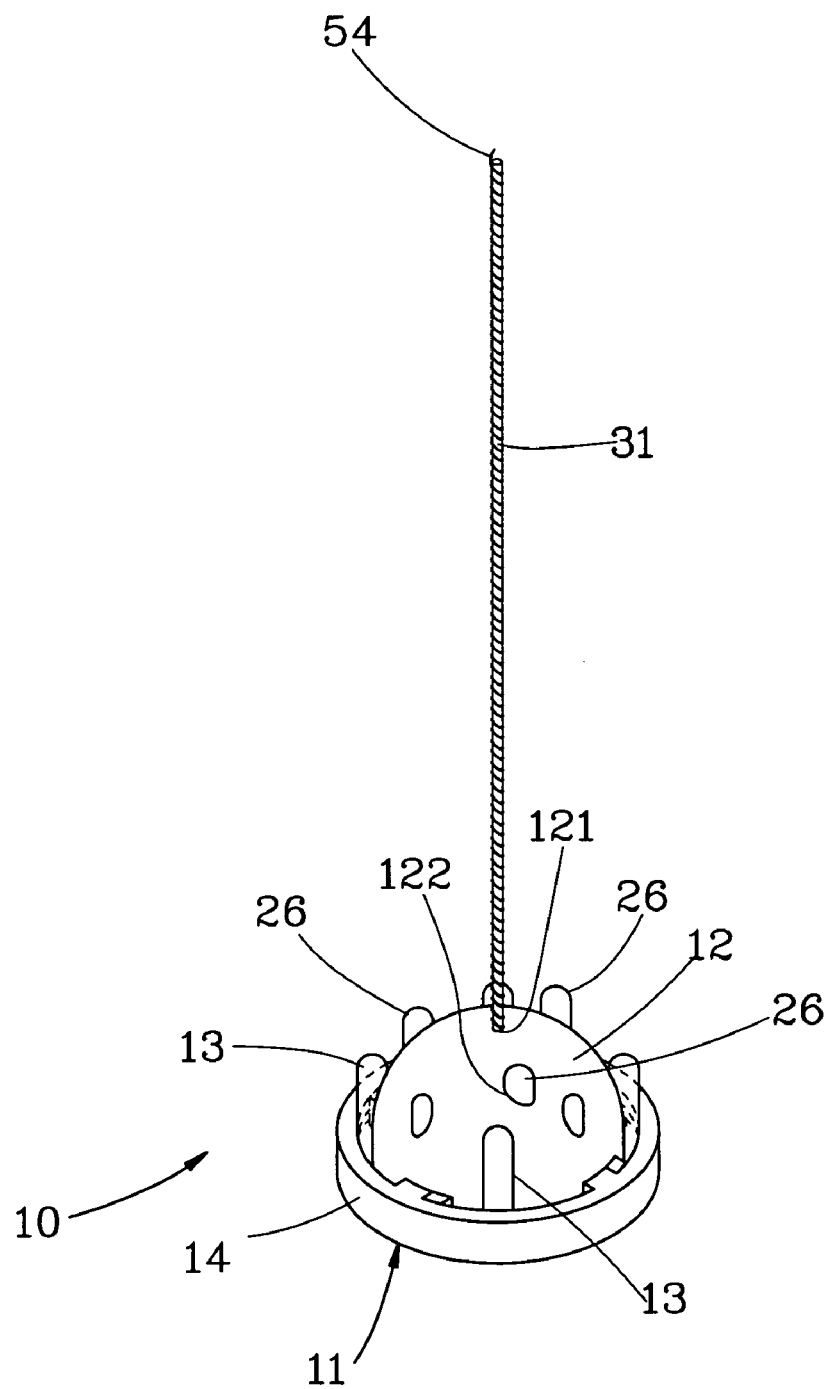
FIG. 1 is a perspective view of a preferred embodiment of the present invention.
Figure 2:
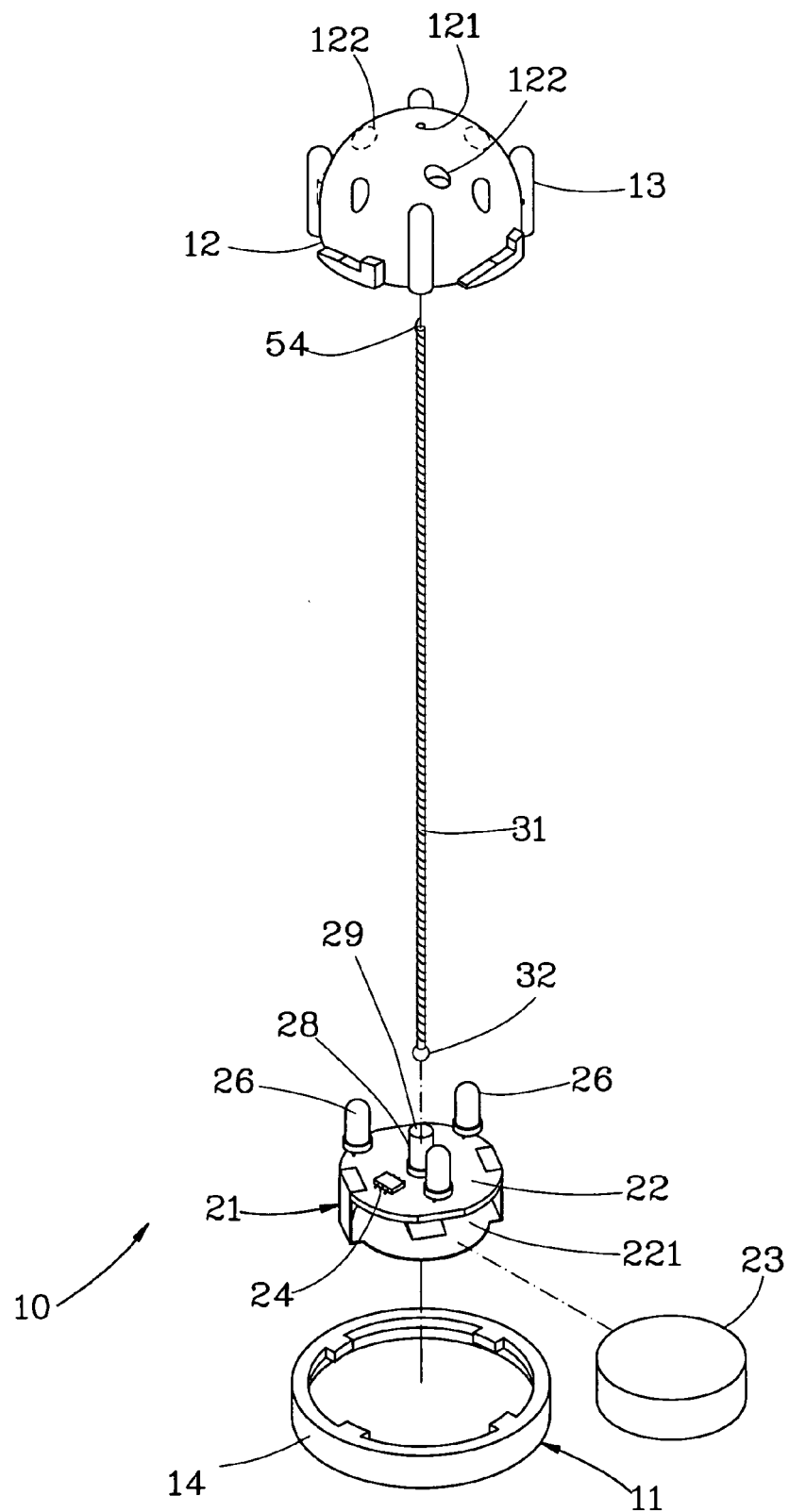
FIG. 2 is an exploded view of the preferred embodiment of the present invention.
Figure 3:
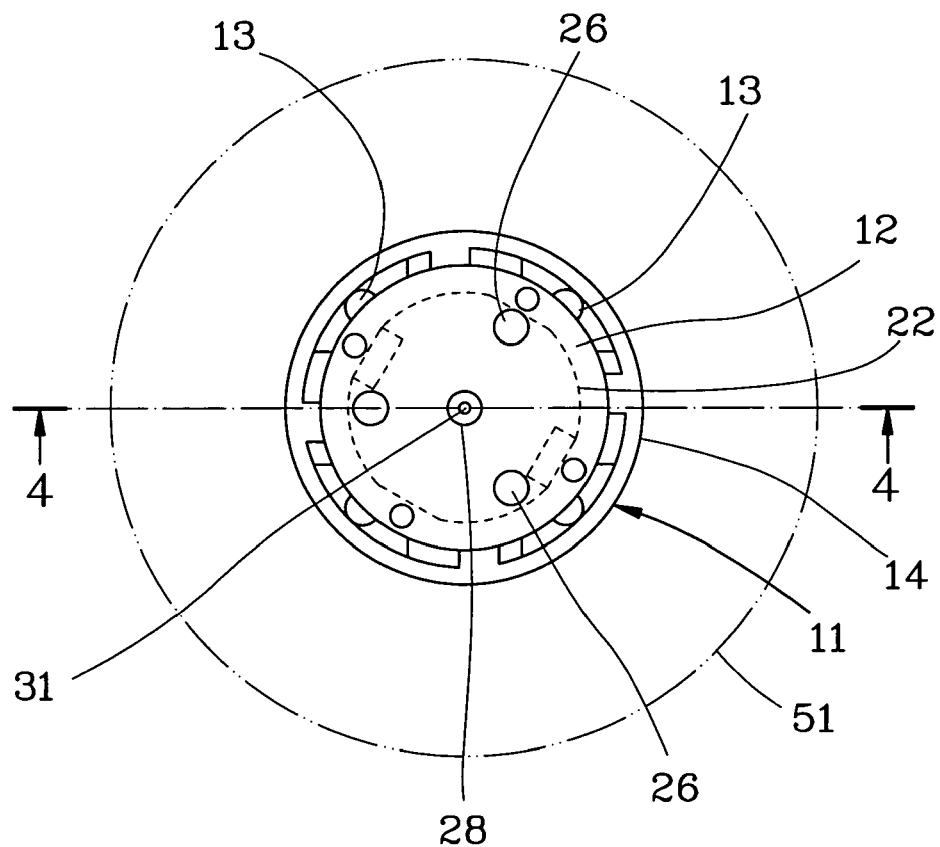
FIG. 3 is a top view of the preferred embodiment of the present invention.

Referring to FIGS. 1–4, a candle light-diversifying device 10 constructed according to a preferred embodiment of the present invention is mounted at a bottom side of a candle 51. The candle 51 includes a tunnel 52 running through an imaginary central axis thereof, and a candlewick 54 received in the tunnel 52. The candle light-diversifying device 10 is composed of a housing 11, a light-emitting module 21, and an optical fiber 31.

The housing 11 includes a base 14 and a semicircular hood 12 covered on the base 14, having a plurality of upright ribs 13 mounted outside the hood 12, an insertion hole 121 formed on a center thereof, and three through holes 122 arranged equiangularly around the insertion hole 122.

The light-emitting module 21 is located inside the housing 11, having a circuit board 22, on which a power source 23, a control circuit 24, three illuminants 26, and a photosensitive element 28 are mounted. The power source 23 can be a battery. The three illuminants 26 are mounted on the circuit board 22 and electrically connected with the control circuit 24 for emitting red light, blue light, and green light respectively, being exposed outside the housing 12. The control circuit 24 is powered by the power source 23 to control the three illuminants 26 for respective or simultaneous illumination. The photosensitive element 28 is mounted on the circuit board 22, electrically connected with the control circuit 24, and located below the insertion hole 121, having a concavity 29 formed on a top end thereof. Because a red dye is applied to the photosensitive element 28, only the light of red spectrum can pass through the photosensitive element 28 to enable the photosensitive element 28 for filtering the light of a predetermined color system. A battery compartment 221 is formed under the circuit board 22 for receiving the power source 23 (battery).

The optical fiber 31 has a spherical portion 32 formed at a bottom end thereof by burning and melting manners. The spherical portion 32 has a larger diameter than that of the insertion hole 121 and thus the optical fiber 31 is inserted through the insertion hole 121 from its bottom side to its top side. The spherical portion 32 is located in the housing 11 and fixedly mounted in the concavity 29 of the photosensitive element 28.

While the housing 11 is mounted at a bottom side of the candle 51, the optical fiber 31 is received in the tunnel 52 of the candle 51, having a top end thereof that is as high as the candlewick 54. The candlewick 54 is wound around the optical fiber 31.

Figure 4:
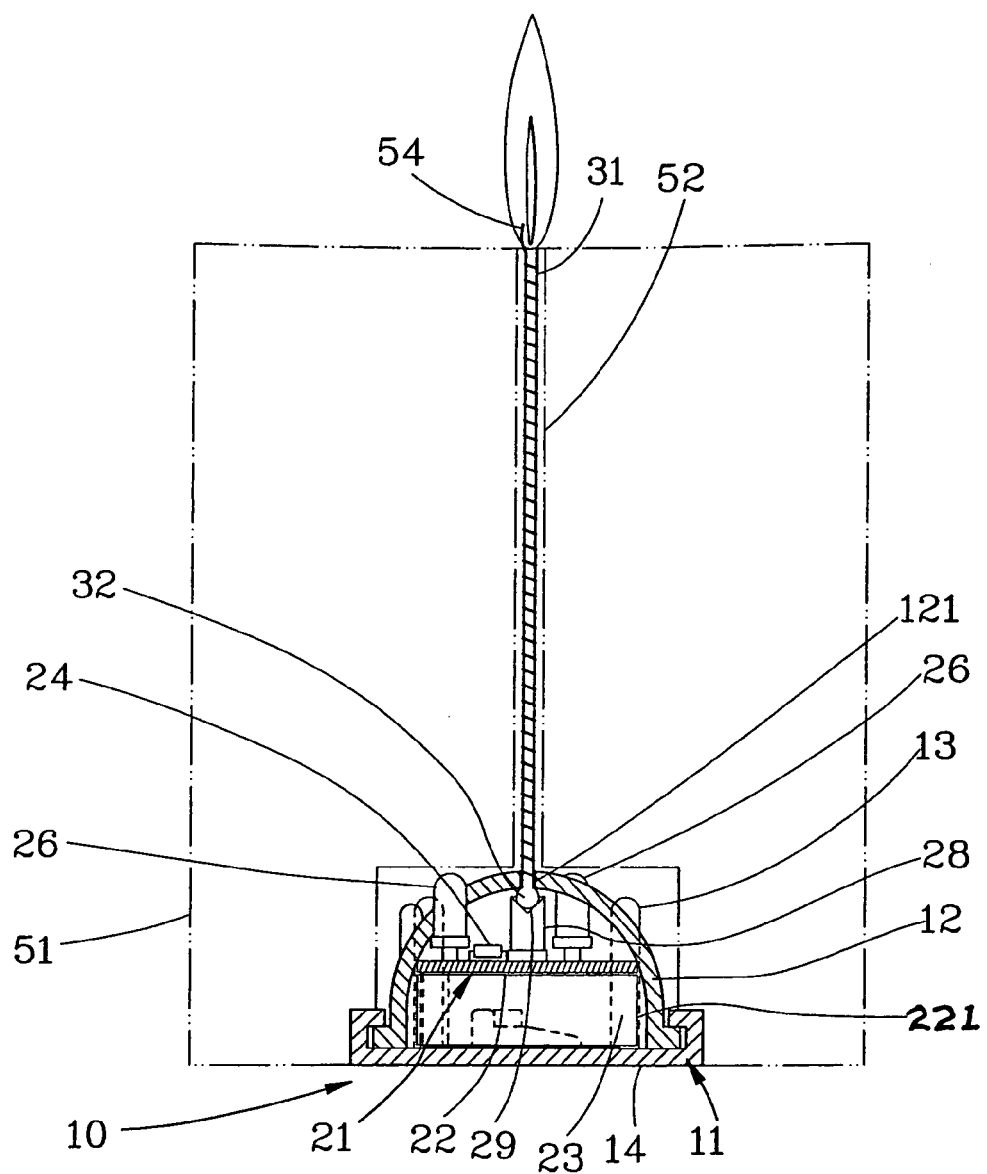
FIG. 4 is a schematic sectional view of the preferred embodiment of the present invention in cooperation with a candle.

Referring to FIG. 4, after the candle 51 is ignited, the candlelight is generated on the candlewick 54 and then transferred through the optical fiber 31 to the photosensitive element 28. While the photosensitive element 28 senses the candlelight, the control circuit 24 starts to control the three illuminants 26 for respective or simultaneous illumination and then change the brightness of the illuminants 26 gradually to enable the illuminants 26 to become brighter and brighter or dimmer and dimmer. In the meantime, because the candle 51 is semi-transparent, the light of the illuminants 26 is mixed with the candlelight in the candle 51 and the mixture of the light presents colorful appearance of the candle 51.

While the candle light-diversifying device 10 is assembled, the spherical portion 32 of the optical fiber 31 can be fixedly mounted between the concavity 29 of the photosensitive element 28 and the hood 12 to avoid disengagement therefrom, such that the locational interrelationship between the optical fiber 31 and the photosensitive element 28 can be secured and the assembly is not subject to defect. In addition, the red dye on the photosensitive element 28 can be taken for sensing the light of the red spectrum generated by the candle 51 to securely prevent the photosensitive element 28 from error action incurred by interference of other light source other than the candlelight. Furthermore, the semicircular hood 12 and the upright ribs 13 enable the candle light-diversifying device 10 to be conveniently and securely mounted in the candle 51.

What is claimed is:

1. A candle light-diversifying device mounted at a bottom side of a candle, said candle having a tunnel and a candlewick, said tunnel running through an imaginary central axis of said candle, said candlewick being received in said tunnel, said candle light-diversifying device comprising:

a housing having three through holes and an insertion hole that run through a top side thereof;

a light-emitting module mounted in said housing and having a power source, a control circuit, three illuminants, and a photosensitive element, said three illuminants being capable of emitting red light, blue light, and green light, said three illuminants being exposed outside said housing through said three through holes and electrically connected with said control circuit, said control circuit being powered by the power source for controlling said three illuminants for respective or simultaneous illumination, said photosensitive element being electrically connected with said control circuit and located below said insertion hole and having a concavity formed at a top end thereof; and an optical fiber having a spherical portion formed at a bottom end thereof, said spherical portion being larger in diameter than said insertion hole, said optical fiber being inserted through said insertion hole from its bottom side to its top side, said spherical portion being located in said housing and fixedly mounted in said concavity;

wherein said optical fiber is received in said tunnel of said candle and a top end of said optical fiber is as high as that of said candlewick while said housing is mounted at the bottom side of said candle.

2. The candle light-diversifying device as defined in claim 1, wherein said housing is composed of a base and a semicircular hood covered on said base, a plurality of upright ribs being mounted outside said hood.

3. The candle light-diversifying device as defined in claim 2, wherein said insertion hole is located at a center of said hood, and said three through holes are arranged equiangularly around said insertion hole.

4. The candle light-diversifying device as defined in claim 3, wherein said power source is a battery.

5. The candle light-diversifying device as defined in claim 4, wherein said light-emitting module further comprises a circuit board and a battery compartment; said three illuminants, said photosensitive element, and said control circuit are mounted on said circuit board, said battery compartment being provided for receiving a battery.

6. The candle light-diversifying device as defined in claim 1, wherein said photosensitive element can filter the light of a predetermined color system.

7. The candle light-diversifying device as defined in claim 6, wherein said photosensitive element is applied with a red dye for penetration of the light of red system only therethrough.

8. The candle light-diversifying device as defined in claim 1, wherein said candlewick is wound around said optical fiber.

* * * * *